United States Patent [19]
Philofsky et al.

[11] 3,942,057
[45] Mar. 2, 1976

[54] FLEXIBLE BELT ARRANGEMENT FOR SECURING WINDING CONDUCTORS

[75] Inventors: Harold M. Philofsky, Pittsburgh; Julius J. Wu, Murrysville, both of Pa.

[73] Assignee: Westinghouse Electric Corporation, Pittsburgh, Pa.

[22] Filed: Jan. 15, 1975

[21] Appl. No.: 541,366

[52] U.S. Cl. ............... 310/260; 310/271; 310/194
[51] Int. Cl.² ..................................... H02K 3/46
[58] Field of Search ........... 310/194, 260, 270, 216, 310/218, 66, 45, 271; 336/197, 185, 208; 57/140 C, 140 G, 152; 28/76 E

[56] References Cited
UNITED STATES PATENTS

| | | | |
|---|---|---|---|
| 3,089,048 | 5/1963 | Bahn | 310/269 |
| 3,344,296 | 9/1967 | Coggeshall | 310/270 |
| 3,344,297 | 9/1967 | Bishop | 310/260 |
| 3,455,100 | 7/1969 | Sidles | 57/152 |
| 3,566,010 | 12/1969 | Drexler | 310/260 |
| 3,665,234 | 5/1972 | Bishop | 310/260 |
| 3,691,416 | 9/1972 | Drexler | 310/260 |
| 3,866,073 | 2/1975 | Gjaja | 310/260 |

Primary Examiner—R. Skudy
Attorney, Agent, or Firm—J. R. Hanway

[57] ABSTRACT

A winding conductor is surrounded by a continuous, flexible belt which is doubled over to provide loops at each end thereof. A non-metallic rod is disposed through the loops and through an opening in an adjacent supporting member. A wedge is inserted in the opening to move the rod and produce tension in the belt for forcing the conductor tightly in a radial direction against the supporting member. The belt consists of a plurality of glass fiber cords which are surrounded by a cured elastomeric material. The cords are formed from glass fiber strands which are twisted sufficiently to provide the desired amount of belt strength and flexibility.

9 Claims, 7 Drawing Figures

FLEXIBLE BELT ARRANGEMENT FOR SECURING WINDING CONDUCTORS

BACKGROUND OF THE INVENTION

1. Field of the Invention

This invention relates, in general, to electrical apparatus and, more specifically, to arrangements for securing the end winding conductors of turbine generators.

2. Description of the Prior Art

Electrical conductors which form the coils of electromechanical apparatus windings must be sufficiently secured to prevent movement of the conductors and damage to the insulation therearound. In large rotating electromechanical apparatus, the large mechanical forces to which the conductors are subjected makes it a difficult task to properly secure the conductors. The conductors of the stator end windings in large turbine generators are typical of conductors where difficulty has been experienced in the prior art in satisfactorily and economically securing the conductors. Ideally, the conductor securing arrangement should firmly secure the conductor throughout the life of the machine and should offer convenient and effective repair techniques if alteration or replacement of a conductor is necessary.

The end winding conductors of turbine generators have been secured by several different arrangements according to the prior art. One arrangement involves tying the radially outermost, or "bottom" conductors, to a non-metallic supporting structure which is fixed to the stator iron core. The tying is accomplished manually by a workman who wraps glass roping around the bottom conductor and through openings in the supporting structure. These ties are repeated at many locations throughout the end winding structure, thus necessitating a very tedious and laborious operation. In addition, the tightness of such ties is dependent upon the ability and consistency of the workman to keep the glass roping tight as it is wrapped around the bottom conductors.

The radially innermost, or "top" conductors, are separated from the bottom conductors by insulating supporting rings or wedges which are positioned between the conductors. These upper conductors are tied to a ring or wedge in much the same manner as the bottom conductors are tied to the supporting structure. Such tying arrangements inherently lack the necessary characteristics which permit a relatively large amount of tension to be placed in the tying arrangement to force the conductor tightly against its associated supporting member. Therefore, it is desirable, and it is an object of this invention, to provide an arrangement for radially supporting the end winding conductors of electromechanical apparatus which provides a relatively large and constant force between the conductor and the supporting member.

End winding conductors are frequently separated from their supporting members by conformable spacers which are placed in compression by the tying arrangement around the conductors. Due to the constant compressive forces, the minute mechanical movements of the conductors, the operating temperature of the apparatus, and other factors, some of the spacers have been known to become loose after a period of operation. Although some initial compressive force is developed by the tying arrangement of the prior art, the compressive force on the spacers is quickly reduced if the spacers become slightly smaller, since the elongation of the glass roping is small. Thus, with a tying arrangement constructed according to the prior art, small decreases in spacer size produce relatively large decreases in the compressive force holding the conductors and spacers together.

It is also desirable, as other objects of this invention, to provide an arrangement for radially supporting the end windings of electromechanical apparatus which may be easily constructed and which provides a sufficient force for maintaining the position of the conductors during the life of the apparatus.

SUMMARY OF THE INVENTION

There is disclosed herein a new and useful arrangement for securing winding conductors of a turbine generator to a supporting member which is positioned radially outside of the conductors. The arrangement includes a continuous belt which is doubled around a conductor and is attached to a rod which extends through an opening in the supporting member. A wedge is also inserted into the opening to move the rod and establish tension in the belt to force the conductor toward the supporting member.

The belt is constructed from a continuous array of glass fiber cords which are sandwiched between a fully cured elastomeric material. Each cord consists of a plurality of glass fiber strands which are individually twisted around their own longitudinal axis and which are also collectively twisted around the axis of the cord. The twisting permits better stretch and strength properties of the belt. The elastomeric material provides the desired flexible properties.

BRIEF DESCRIPTION OF THE DRAWING

Further advantages and uses of this invention will become more apparent when considered in view of the following detailed description and drawing, in which.

DESCRIPTION OF THE PREFERRED EMBODIMENTS

Figure 1:
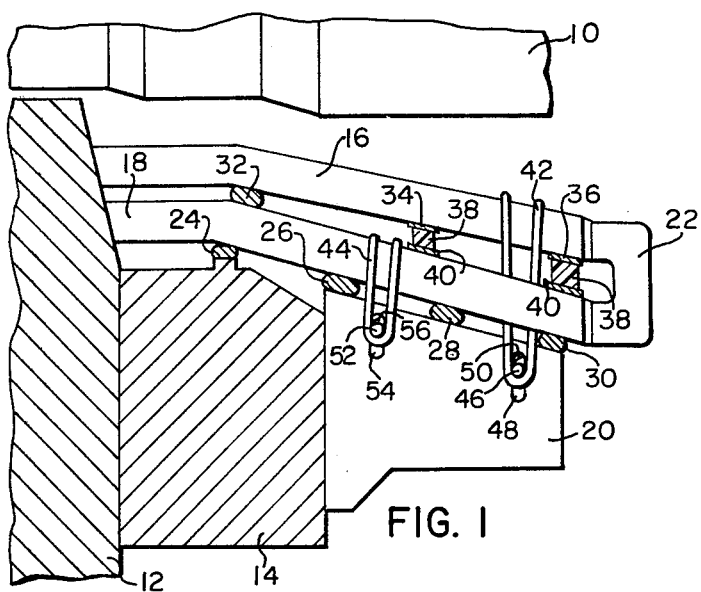
FIG. 1 is a partial view of a turbine generator constructed according to this invention.

Throughout the following description, similar reference characters refer to similar elements or members in all of the figures of the drawing. Referring now to the drawing, and to FIG. 1 in particular, there is shown a portion of a turbine generator constructed according to this invention. The generator includes the rotor assembly 10, the stator iron core 12, and the stator iron core extension 14. The top end winding conductor 16 and the bottom end winding conductor 18 extend from the stator iron core 12 and are secured to the supporting member 20. In a complete turbine generator, conductors similar to the conductors 16 and 18 extend from the stator iron core 12 substantially around the entire circumference of the rotor assembly 10. However, for simplicity, only one top and one bottom end winding conductor is illustrated. In addition, the conductors 16 and 18 are not usually aligned in the same radial plane but cross each other at a location which is substantially between the positions where the conductors are tied to the supporting member 20. The connector 22 appropriately connects together the conductors 16 and 18 to provide the electrical path necessary for the proper operation of the generator. Generally, the conductors 16 and 18 include a plurality of metallic strands which conduct the current through the conductors and cooling ducts through which cooling fluid flows to cool the conductors.

The bottom conductor 18 is separated from the stator iron core extension 14 by the spacer 24 and from the supporting member 20 by the spacers 26, 28 and 30. These spacers may be constructed of a suitable material, such as resin impregnated Dacron cloth which conforms uniformly to the surfaces pressing against them. The conductors 16 and 18 are separated by the spacer 32, and the spacer blocks 34 and 36. The spacer blocks 34 and 36 are constructed of a solid member 38, such as Micarta, which is covered with a resin impregnated material 40 to allow the spacer blocks to conform to the surfaces against which they are positioned. In some electromechanical apparatus, the conductors 16 and 18 would be separated by spacing rings which are positioned between the conductors and extend around the axis of the rotor assembly 10.

The conductors 16 and 18 are secured to the supporting member 20 by the belts 42 and 44, respectively. These belts are constructed of a reinforced elastomeric material which will be described in more detail hereinafter. The arrangement for attaching the belts 42 and 44 to the supporting member 20 are similar. The belt 42 is positioned around the rod 46 which extends through the opening 48 in the supporting member 20. The rod 46 may be constructed of a suitable non-metallic material, such as glass fiber reinforced epoxy. The opening 48 is larger than the rod 46 to permit downward movement of the rod 46 for increasing the tension in the belt 42. A wedge 50 is positioned between the rod 46 and the upper surface of the opening 48 to provide the desired amount of tension in the belt 42. The rod 52, the opening 54, and the wedge 56 associated with the belt 44 are similar to the corresponding members associated with the belt 42.

Figure 2:
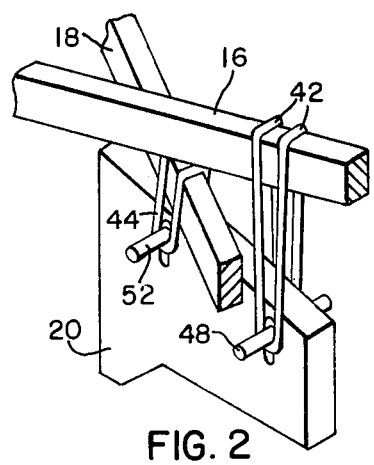
FIG. 2 is a partial view of conductors secured by the tying arrangement taught by this invention.

FIG. 2 is another view of the arrangement used to secure the conductors 16 and 18 to the supporting member 20. The spacers and spacer blocks are not illustrated in FIG. 2, and additional conductors which would run substantially parallel to the conductors 16 and 18 are not shown in the interest of clarity. The belts 42 and 44 are doubled around the conductors and the loops at the ends of the belts extend around the rods 48 and 52 as shown in FIG. 2. In general, a belt extends around a conductor at the location where the conductor passes over a supporting member. Thus, since most turbine generators have several supporting members extending from the stator iron core, several belts may extend around the same conductor for radially securing the conductor.

Figure 3:
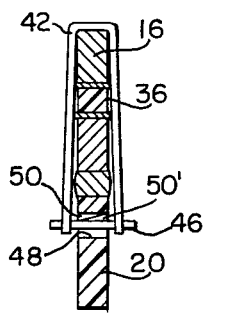
FIG. 3 is a cross-sectional view of a conductor secured by the tying arrangement taught by this invention.

FIG. 3 is a cross-sectional view of the conductor 16 secured to the supporting member 20. The continuous, flexible belt 42 is doubled around the conductor 16 and looped around the rod 46. The wedges 50 and 50' are inserted between the rod 46 and the upper surface of the opening 48. The relative position of the wedges 50 and 50' determine the distance by which the rod 46 is separated from the upper surface of the opening 48. Therefore, the wedges 50 and 50' can be used to adjust the tension in the belt 42 and increase the force between the conductor 16 and the supporting member 20 which are separated by the spacer block 36. Any convenient resin or adhesive combination may be used to maintain the position of the wedges 50 and 50'.

Figure 4:
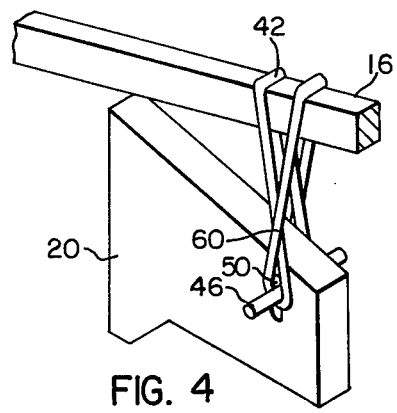
FIGS. 4 and 5 are views illustrating different belt surrounding arrangements which may be used according to this invention.
Figure 5:
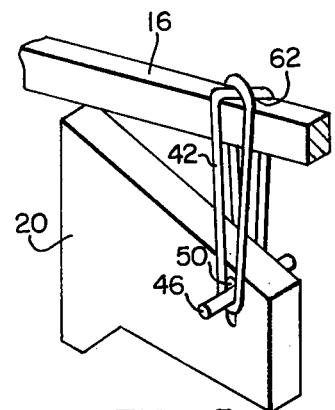

FIGS. 4 and 5 illustrate various arrangements of the belt 42 which may be used for securing the conductor 16 to the supporting member 20. Similar arrangements may be used for the belt 44. In FIG. 4, the belt 42 is twisted on each side of the conductor 16, such as at position 60. In FIG. 5, the belt 42 is twisted at the top of the conductor 16, as shown at position 62. These twisting arrangements may be used to adjust the lengths of the belts for differences in the size of the conductors and the spacers therebetween.

Figure 6:
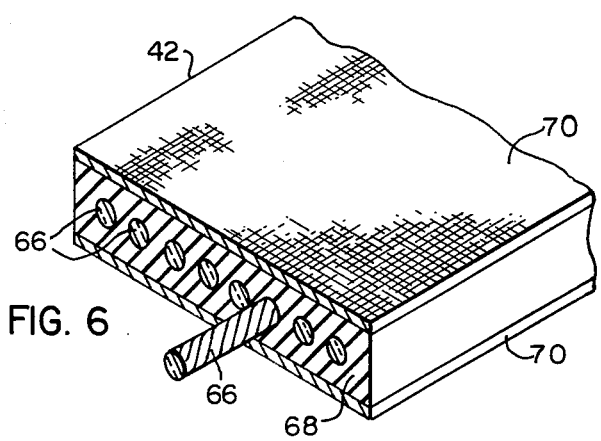
FIG. 6 is a view illustrating the construction of the belt used according to this invention.

FIG. 6 illustrates, in detail, the construction of the belt 42. Although the belt 42 is a continuous loop which is doubled over to provide a flexible member having generally two ends, only a single portion of the belt is illustrated in detail in FIG. 6. As shown in FIG. 6, the belt 42 includes a plurality of glass fiber cords 66 which are surrounded by an elastomeric material 68. A suitable backing material 70, such as cotton duck, is positioned on both sides of the belt to increase the ability of the belt to withstand surface tearing.

The belt 42 may be constructed by placing a semi-cured elastomeric material around a mandrel and over-winding the elastomeric material with the glass fiber cords. The number of cords in a cross-section of the belt is determined by the number of revolutions made by the mandrel in winding the glass fiber cords on the elastomeric material. The number of cords in a cross-sectional area of the belt is selected to provide the desired tensile strength for the belt 42. The assembly is covered with a suitable overlay or jacket and then pressure cured by heat or hydraulic pressure in a suitable mold.

A suitable belt may be constructed by using neoprene rubber stock which is approximately 62 mils thick, G75 5/4, 2.5S rubber impregnated fiber glass cords, and a cotton duck overlay or jacket. Another example of suitable materials includes ethylene propylene rubber stock, approximately 125 mils thick, G75 515/3, 1.0S rubber impregnated fiber glass cords, and a nylon duck overlay or jacket. A third example of suitable materials consists of butyl rubber stock, approximately 100 mils thick, G75 7/0, 1.5S rubber impregnated fiber glass cords and a Dacron duck overlay or jacket. While the above examples of material combinations are illustrative of material which may be used to construct suitable belts, it is emphasized that other material combinations may be used for the belt 42, and for the other securing belts, without departing from the spirit of the invention.

Figure 7:
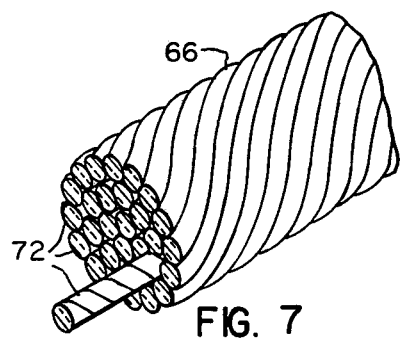
FIG. 7 is a view illustrating the construction of a cord for use in the belt shown in FIG. 6.

FIG. 7 is an enlarged view of one of the cords 66 shown in FIG. 6. The cord 66 includes a plurality of strands 72. The strands 72 are each individually twisted about its own longitudinal axis. In addition, the entire cord comprising all of the strands 72 is twisted about the longitudinal axis of the cord. The double twisting technique illustrated herein provides a glass fiber cord which suitably provides the strength and flexibility requirements needed to permit the belt 42 to satisfactorily perform as a conductor securing member in a turbine generator. Glass fiber strands arranged without any twisting do not provide the flexibility and durability desired for the belt 42.

The elasticity and flexibility of the belt 42 permits the radial securing of turbine conductors in a manner which offers several advantages over prior art arrangements. A predetermined and long lasting stress can be placed in the belt to force the conductor against the supporting member throughout the life of the machine, even if the associated spacing elements change size. Removal of the belt is relatively simple due to its flexibility, thus making winding repair easier.

Since numerous changes may be made in the above described apparatus, and since different embodiments of the invention may be made without departing from the spirit thereof, it is intended that all of the matter contained in the foregoing description, or shown in the accompanying drawing, shall be interpreted as illustrative rather than limiting.

We claim as our invention:

1. Electromechanical apparatus having a stator iron core, comprising:
   stator end winding conductors extending from the stator iron core;
   a non-metallic supporting structure coupled to the stator iron core;
   a resilient and flexible member reinforced with non-metallic cores of twisted strands, said flexible member having two ends and being disposed around a portion of an end winding conductor; and
   means for connecting the ends of said flexible member to the supporting structure to develop a tensile stress in the flexible member which tends to pull said conductor toward the supporting structure.

2. The electromechanical apparatus of claim 1 wherein the cords of the flexible member are surrounded by an elastomeric material.

3. The electromechanical apparatus of claim 2 wherein the elastomeric material comprises a rubber material.

4. The electromechanical apparatus of claim 1 wherein the cords comprise a plurality of glass fiber strands.

5. The electromechanical apparatus of claim 4 wherein each strand is individually twisted around its longitudinal axis.

6. The electromechanical apparatus of claim 1 wherein the flexible member comprises a continuous belt folded over to provide loops at each end.

7. The electromechanical apparatus of claim 1 wherein the cords in the flexible member are oriented substantially parallel to the longest dimension of the flexible member.

8. The electromechanical apparatus of claim 1 wherein the means for connecting the ends of the flexible member to the supporting structure comprises a non-metallic rod positioned through an opening in the supporting structure and through loops at the ends of the flexible member, and at least one wedge-shaped member positioned in said opening for forcing said rod in a direction which produces tension in the flexible member.

9. Electromechanical apparatus having a stator iron core, comprising:
   stator end winding conductors extending from the stator iron core;
   a non-metallic supporting structure coupled to the stator iron core;
   a continuous, flexible, and resilient belt folded over to provide loops at each end thereof, said belt being disposed around a portion of an end winding conductor, and said belt including an elastomeric material reinforced with a continuous array of parallel cords constructed of twisted, nonmetallic strands; and
   means for connecting the ends of said belt to the supporting structure to develop a tensile stress in the belt which tends to pull said conductor toward the supporting structure.

* * * * *